United States Patent
Jeon et al.

(10) Patent No.: US 9,840,949 B2
(45) Date of Patent: Dec. 12, 2017

(54) VALVE SWITCHING APPARATUS

(71) Applicant: Hyundai Motor Company, Seoul (KR)

(72) Inventors: Jae Hee Jeon, Hwaseong-si (KR); You Sang Son, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 95 days.

(21) Appl. No.: 14/933,932

(22) Filed: Nov. 5, 2015

(65) Prior Publication Data

US 2016/0348541 A1    Dec. 1, 2016

(30) Foreign Application Priority Data

May 29, 2015    (KR) .................. 10-2015-0075769

(51) Int. Cl.
| | | |
|---|---|---|
| *F01L 13/00* | (2006.01) | |
| *F01L 1/18* | (2006.01) | |
| *F01L 1/14* | (2006.01) | |
| *F01L 1/24* | (2006.01) | |
| *F01L 1/20* | (2006.01) | |
| *F01L 1/26* | (2006.01) | |
| *F02D 41/00* | (2006.01) | |

(52) U.S. Cl.
CPC .......... *F01L 13/0026* (2013.01); *F01L 1/146* (2013.01); *F01L 1/18* (2013.01); *F01L 1/181* (2013.01); *F01L 1/185* (2013.01); *F01L 1/2405* (2013.01); *F01L 13/0005* (2013.01); *F01L 13/0021* (2013.01); *F01L 13/0036* (2013.01); *F01L 13/0063* (2013.01); *F01L 1/20* (2013.01); *F01L 1/267* (2013.01); *F01L 2105/00* (2013.01); *F02D 2041/001* (2013.01); *Y02T 10/18* (2013.01)

(58) Field of Classification Search
CPC ....... F01L 2105/00; F01L 1/185; F01L 1/181; F01L 1/267; F01L 1/18; F01L 1/146; F01L 1/2405; F01L 13/0005; F01L 13/0026; F01L 13/0036; F01L 13/0021; F01L 13/0063; Y02T 10/18; F02D 2041/001
USPC ..................... 123/90.16, 90.15, 90.39, 90.44
See application file for complete search history.

(56) References Cited

U.S. PATENT DOCUMENTS

2001/0003973 A1* 6/2001 Nakamura .......... F01L 13/0021
                                                    123/90.16

FOREIGN PATENT DOCUMENTS

| JP | S56-92313 A | 7/1981 | |
| JP | S62-199913 A | 9/1987 | |
| JP | 2004-293632 A | 10/2004 | |
| JP | WO 2013057804 A1 * | 4/2013 | .......... F01L 13/0015 |
| KR | 10-1998-025679 A | 7/1998 | |
| KR | 10-1998-076672 A | 11/1998 | |

OTHER PUBLICATIONS

WO2013057804 english language machine translation.*

* cited by examiner

*Primary Examiner* — Mark Laurenzi
*Assistant Examiner* — Wesley Harris
(74) *Attorney, Agent, or Firm* — McDermott Will & Emery LLP

(57) ABSTRACT

A valve switching apparatus includes a rocker arm coming into contact with a cam to open and close a valve along with a rotation of the cam, and an eccentric generation means provided to the rocker arm so as to allow an eccentric position to be changed by rotation thereof.

6 Claims, 5 Drawing Sheets

VALVE SWITCHING APPARATUS

CROSS-REFERENCE(S) TO RELATED APPLICATIONS

This application claims the benefit of priority to Korean Patent Application No. 10-2015-0075769, filed on May 29, 2015 with the Korean Intellectual Property Office, which is incorporated herein by reference in its entirety.

TECHNICAL FIELD

Exemplary embodiments of the present disclosure relate to a cam and a rocker arm which open and close a valve for supplying air to a cylinder of an engine, and more particularly, to a mechanical valve switching apparatus capable of adjusting the switching time and opening degree of a valve without using hydraulic pressure.

BACKGROUND

In general, when an engine is operated, air and fuel are supplied to a combustion chamber of a cylinder. The fuel is injected by an injector, whereas the air is supplied to the combustion chamber by the operation of a cam and a valve provided in a cylinder head. In such a case, it is necessary to adjust the switching time or opening degree of the valve according to the operating range of the engine. In order to transfer the intake air in the cam and the valve to the combustion chamber in the related art, the valve arranged on the upper surface of the combustion chamber is opened and closed through the cam using a hydraulic circuit.

FIG. 1 is a view illustrating a conventional valve switching apparatus. In the conventional valve switching apparatus, the switching time and opening degree of a vale 10 are controlled through a cam 20 using a hydraulic circuit. The hydraulic circuit consists of a plurality of components such as a pump unit 30, a high-pressure chamber 40, an accumulator 50, a deaerator 60, an intermediate-pressure chamber 70, a check valve 80, a solenoid valve 90, and a brake unit 95. For this reason, the hydraulic circuit has disadvantages of having a complicated structure and increased weight and costs. In addition, since a response of the hydraulic system is delayed when the volume of the closed circuit is increased, the performance of the hydraulic system is decreased Accordingly, there is a need for a valve switching apparatus having a simple structure and an improved response while controlling the switching time and opening degree of a valve through a cam.

The matters described as the related art have been provided only for assisting the understanding for the background of the present disclosure and should not be considered as corresponding to the related art already known to those skilled in the art.

SUMMARY OF THE DISCLOSURE

An embodiment of the present disclosure is directed to a valve switching apparatus having a simple structure and improved response while controlling the switching time and opening degree of a valve through a cam.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a valve switching apparatus includes a rocker arm coming into contact with a cam to open and close a valve along with a rotation of the cam, and an eccentric generation means provided to the rocker arm so as to allow an eccentric position to be changed by a rotation thereof.

The eccentric generation means may include eccentric cams rotatably arranged to the rocker arm and a rotary shaft eccentrically coupled to the eccentric cams, and the eccentric position of each of the eccentric cams may be adjusted according to a rotation of the rotary shaft so that a degree of contact between the cam and the rocker arm is adjustable.

A rotating member may be coupled through one side of the rocker arm by a pin, and a pressure section may be provided to the other side thereof such that the valve is pressed by the pressure section.

The rocker arm may include a body coupled to the eccentric cams and an operation section pressed by the body to press the valve, and the operation section may be coupled through the body by the rotary shaft.

The body may have a front portion, a rear portion, and a coupling portion, the front portion may be symmetrical to the rear portion, through-holes may be respectively formed at centers of the front and rear portion so that the eccentric cams are coupled to the through-holes, coupling holes may be formed at one side of the body, and push portions may be formed at the other side of the body while extending laterally from upper sides of the through-holes.

The operation section may have a rotation hole formed at one side thereof, the rotary shaft may pass through the rotation hole, the operation section may have an extension portion formed at the other side thereof, the extension portion may extend laterally from an upper side of the rotation hole, the extension portion may be provided with a pressure section, and the extension portion may be formed with support protrusions protruding to the left and right.

The body may have through-holes formed at a center thereof so that the eccentric cams are coupled to the through-holes, the body may have coupling holes formed at one side thereof, the body may have push portions formed at the other side thereof, the operation section may have a rotation hole formed at one side thereof, the operation section may have an extension portion formed at the other side thereof, the extension portion may be provided with a pressure section, the rotary shaft may pass through the eccentric cams and the rotation hole so that the body is coupled to the operation section, and the push portions may press support protrusions formed at the extension portion such that the pressure section presses the valve.

The operation section may have a bearing provided at a point in which the operation section corresponds to the rotary shaft.

Bearings may be coupled to an outer peripheral surface of each of the eccentric cams.

DETAILED DESCRIPTION

Figure 1:
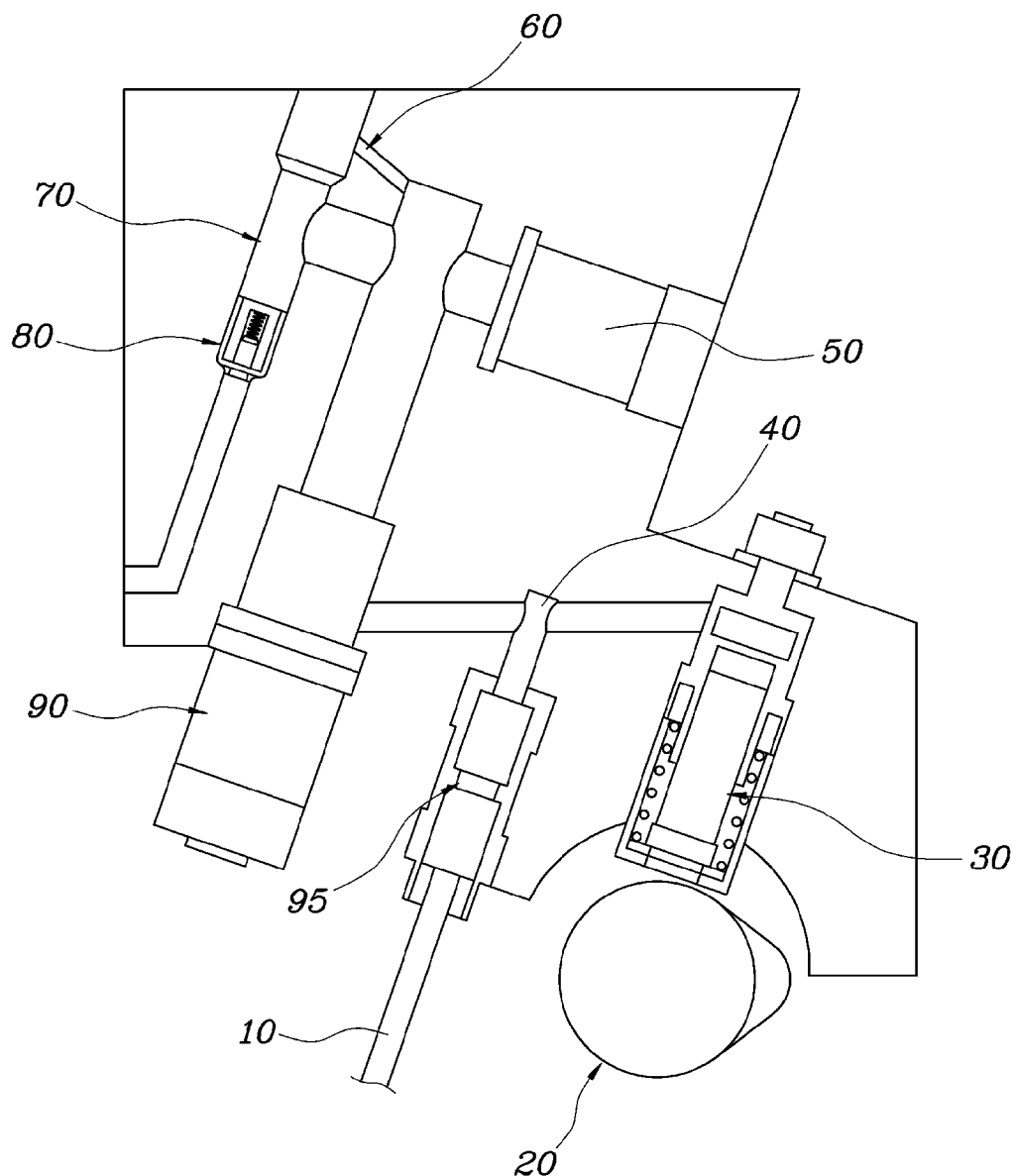
FIG. 1 is a view illustrating a conventional valve switching apparatus.

A valve switching apparatus according to exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 2:
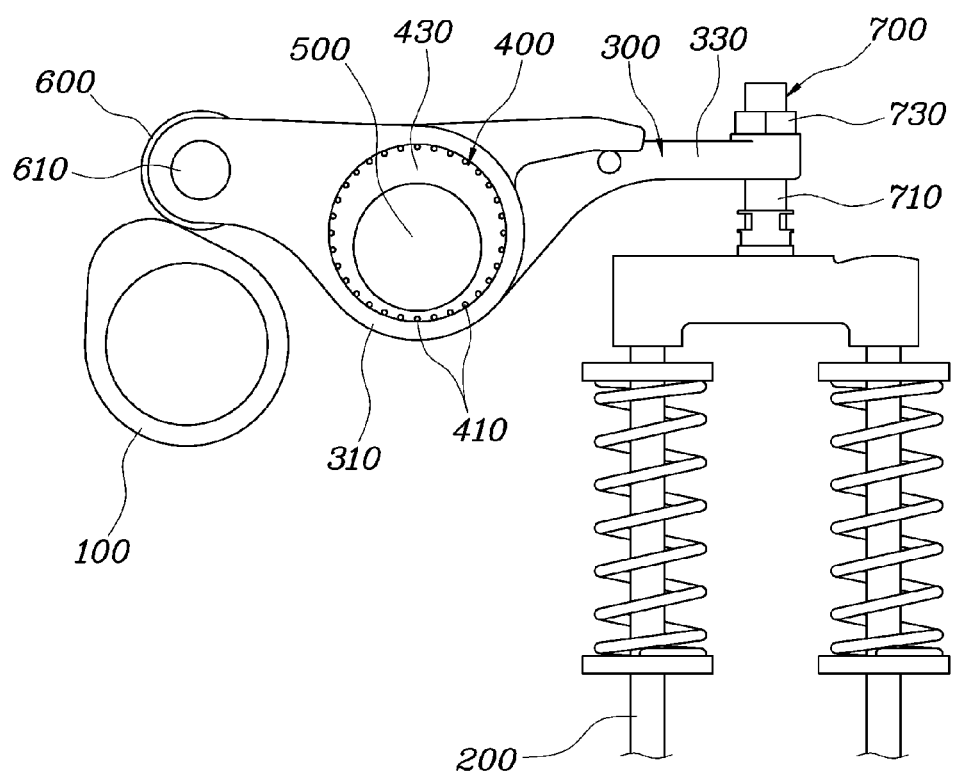
FIG. 2 is a view illustrating a valve switching apparatus according to an embodiment of the present disclosure.
Figure 3:
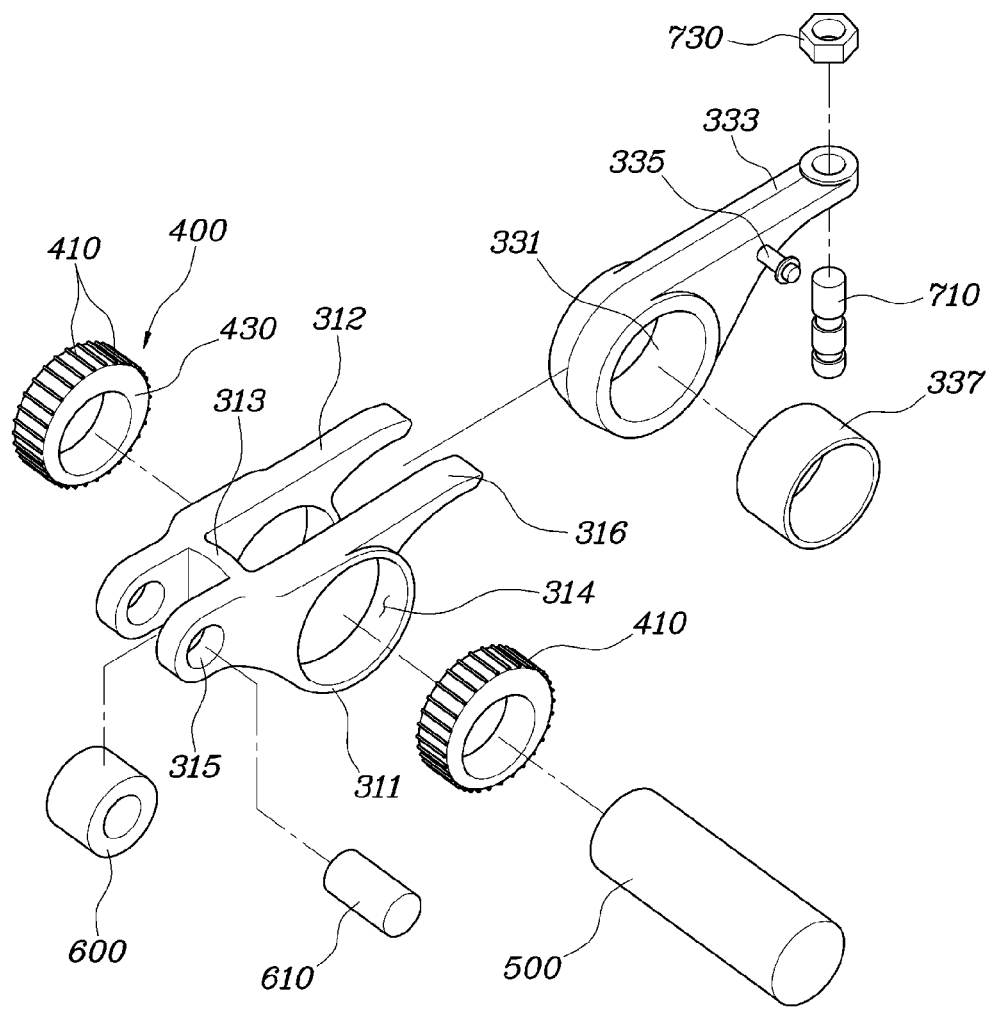
FIG. 3 is an exploded perspective view of a rocker arm in FIG. 2.
Figure 4:
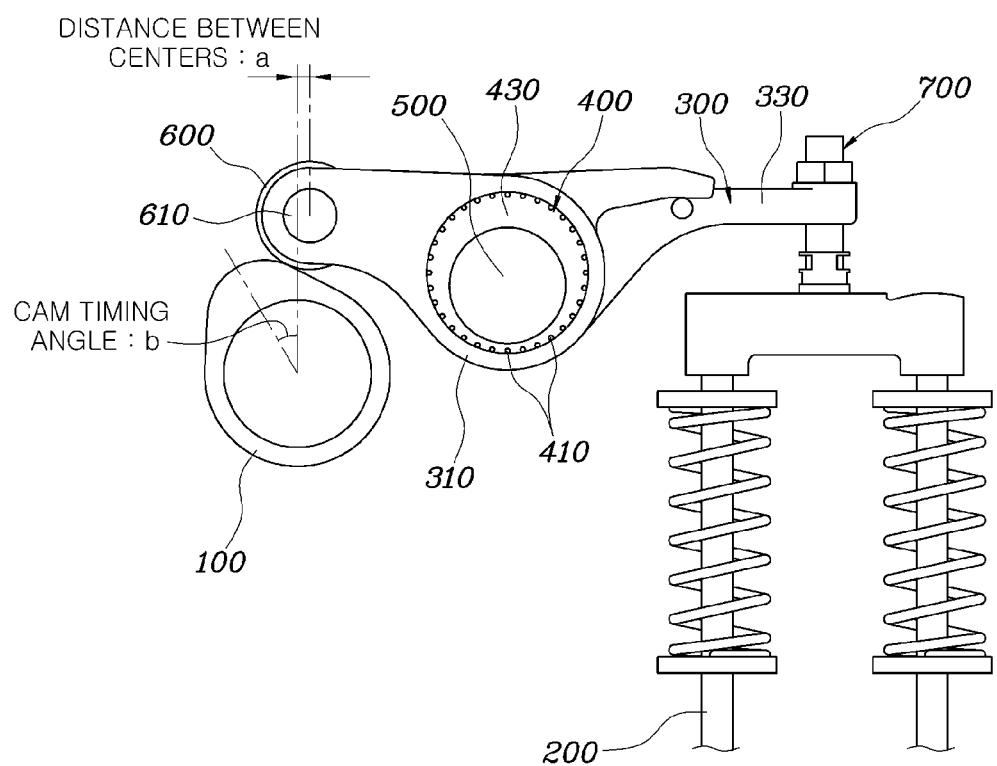
FIG. 4 is a view illustrating an OFF state of variable control.
Figure 5:
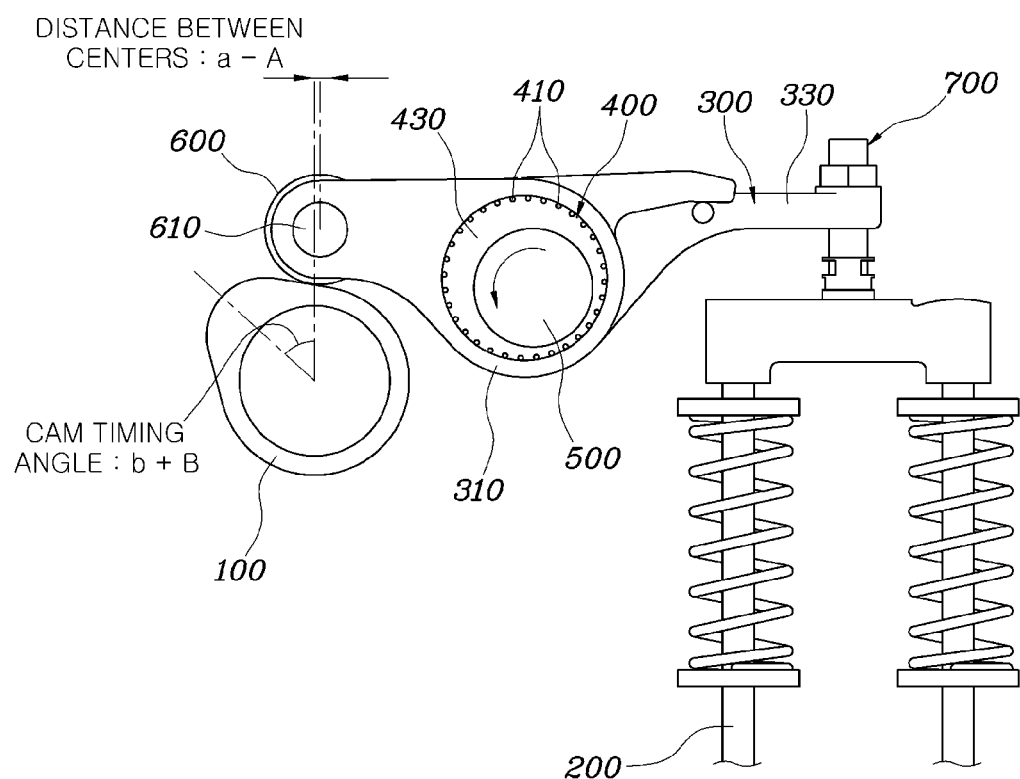
FIG. 5 is a view illustrating an ON state of variable control.

FIG. 2 is a view illustrating a valve switching apparatus according to an embodiment of the present disclosure. FIG. 3 is an exploded perspective view of a rocker arm 300 in FIG. 2. FIG. 4 is a view illustrating an OFF state of variable control. FIG. 5 is a view illustrating an ON state of variable control.

As illustrated in FIGS. 2 and 3, the valve switching apparatus according to the embodiment of the present disclosure includes a rocker arm 300 which comes into contact with a cam 100 to open and close a valve 200 along with the rotation of the cam 100, and an eccentric generation means which is provided to the rocker arm 300 so as to allow an eccentric position 430 to be changed by the rotation thereof. The eccentric generation means includes eccentric cams 400 which are rotatably arranged to the rocker arm 300, and a rotary shaft 500 which is eccentrically coupled to the eccentric cams 400. Accordingly, the eccentric position 430 of each eccentric cam 400 is adjusted according to the rotation of the rotary shaft 50, and thus the degree of contact between the cam 100 and the rocker arm 300 is adjustable.

In addition, a rotating member 600 may be coupled through one side of the rocker arm 300 by a pin 610, and a pressure section 700 may be provided to the other side thereof. The rotating member 600 may be a roller. The switching time and opening degree of the valve 200 are determined according to the relationship between the rotating member 600 and the cam 100, i.e. according to how the distance between the center of the cam 100 and the center of the pin 610, which is the center of rotation of the rotating member 600, is set.

Thus, in the present disclosure, the distance between the centers of the cam 100 and the pin 610 is adjusted by changing the eccentric position 430 according to the rotation of the rotary shaft 500 of the eccentric generation means, thereby enabling the switching time and opening degree of the valve 200 to be variably controlled. The pressure section 700 is formed integrally with the rocker arm 300, and may be a screw or a similar device. However, the present disclosure illustrates that the pressure section 700 is configured of a screw 710 and a fastening member 730 such that the switching time and opening degree of the valve 200 may be accurately adjusted once again by the pressure section 700. The fastening member 730 is provided as a nut and the screw is adjusted by the nut.

In the present disclosure, the displacement of the rocker arm 300 is changed by the cam 100 as in the typical valve switching apparatus. The rocker arm 300 pressures or releases the valve 200 according to the change in displacement of the rocker arm 300, thereby allowing the valve 200 to be opened or closed. The typical valve switching apparatus mainly uses the cam in order to change the switching time of the valve. However, the present disclosure provides the eccentric generation means to the rocker arm 300. Consequently, the valve switching apparatus of the present disclosure may mechanically vary the switching time and opening degree of the valve 200 and have a simple structure. Since the mechanism in which the valve 200 is opened and closed by the cam 100 is apparent to those skilled in the art, a detailed description thereof will be omitted.

In addition, the rocker arm 300 may also adjust the eccentric position 430 according to the rotation of the rotary shaft 500 by forming the eccentric generation means in a typical rocker arm, so as to variably control the switching time and opening degree of the valve 200. The case where the rocker arm 300 is configured of a body 310 and an operation section 330 will be illustrated and described in an embodiment of the present disclosure.

As illustrated in FIGS. 2 and 3, the rocker arm 300 may include a body 310 coupled to the eccentric cams 400 and an operation section 330 pressed by the body 310 to open the valve 200. The operation section 330 is coupled through the body 310 by the rotary shaft 500. Consequently, the eccentric cams 400 are rotated by the rotation of the rotary shaft 500 to change the eccentric positions 430, thereby allowing the contact position between the rocker arm 300 and the cam 100 to vary. Thus, the switching time and opening degree of the valve 200 may be adjusted.

The configuration of the rocker arm 300 will be described in more detail. The body 310 may include a front portion 311, a rear portion 312, and a coupling portion 313. The front portion 311 may be symmetrical to the rear portion 312, and through-holes 314 may be respectively formed at the centers of the front and rear portion 311 and 312. Each of the front and rear portion 311 and 312 may be a plate having a predetermined thickness, and may have an inverted triangle shape from the wide range. The front and rear portion 311 and 312 may be spaced by a predetermined distance through the coupling portion 313 arranged between the through-holes 314 and coupling holes 315 formed at one side of the body 310. The eccentric cams 400 may be coupled to the through-holes 314, respectively. In addition, push portions 316, which extend laterally from the upper sides of the through-holes 314, may be formed at the other side of the body 310. The rotating member 600 may be coupled to the coupling holes 315 by the pin 610, and thus the rotating member 600 may transfer the rotary force of the cam 100 to the rocker arm 300 according to the rotation of the cam 100 and simultaneously rotates while supporting the cam 100.

In addition, the operation section 330 may have a rotation hole 331 formed at one side thereof, the rotation hole 331 may have a shape corresponding to the outer diameter of the rotary shaft 500, and the rotary shaft 500 may pass through the rotation hole 331. Accordingly, the rotation hole 331 may be provided with a bearing 337 at a point in which the rotation hole 331 corresponds to the rotary shaft 500. The bearing 337 may be provided such that the rotary shaft 500 performs a more smooth relative motion in the rotation hole 311. When the rocker arm 300 is made of aluminum, the bearing 337 may be removed. However, when the rocker arm 300 is made of cast iron by forging, the bearing 337 may or may not be removed.

The operation section 330 may have an extension portion 333 formed at the other side thereof, the extension portion 333 may extend laterally from the upper side of the rotation hole 331, and the pressure section 700 may be located at the extension portion 333. The extension portion 333 may be formed with support protrusions 335 which protrude to the left and right from predetermined points. Particularly, the support protrusions 335 may be formed at points corresponding to the push portions 316 of the body 310 and the push portions 316 may press the support protrusions 335, so that the operation section 330 is operated to press the valve 200. As illustrated in the drawings, the support protrusions 335 may be formed integrally with the operation section 330. Alternatively, the support protrusion 335 may also be separately formed and coupled to a hole (not shown) formed at the rocker arm 300.

In accordance with the coupling relationship between the body 310 and the operation section 330, the front and rear portion 311 and 312 of the body 310 may be spaced by a predetermined distance, and the eccentric cams 400 may be coupled to the through-holes 314 formed at the front and rear portion 311 and 312, respectively. Bearings 410 may be coupled to the outer peripheral surface of each eccentric cam 400 such that the eccentric cam 400 smoothly rotates relative to the associated through-hole 314. Each of the bearings 410 may be a needle bearing, and the needle bearings may be arranged at predetermined intervals along the outer peripheral surface of the eccentric cam 400. However, the bearings 410 of the eccentric cam 400 may also be omitted according to environments or designs, similarly to the bearing 337.

After the operation section 330 may be inserted between the front and rear portions 311 and 312, the rotary shaft 500 may be coupled through the eccentric cam 400 at the front portion 331, the rotation hole 331 of the operation section 330, and the eccentric cam 400 at the rear portion 312. Thus, when the rotary shaft 500 rotates, the eccentric cams 400 also may rotate so that the eccentric positions 430 are changed, thereby allowing the contact position between the rocker arm 300 and the cam 100 to be changed. Therefore, the support protrusions 335 of the operation section 330 may be pressed by the push portions 316 of the body 310 in the state in which the contact position between the rocker arm 300 and the cam 100 is changed, and thus the valve 200 is pressed. Consequently, the switching time and opening degree of the valve 200 may be adjusted.

Although not separately illustrated in the present disclosure, the rotary shaft 500 may be driven by a drive section (not shown) controlled by a control unit (not shown). However, this structure is changeable within the range allowed by those skilled in the art.

The operation according to the eccentric variable control of the valve switching apparatus will be described in more detail with reference to FIGS. 4 and 5.

FIG. 4 is a view illustrating an OFF state of variable control. Since the eccentric position 430 generated by each eccentric cam 400 and the rotary shaft 500 may be located at the upper side in FIG. 4, eccentricity may not be generated on the basis of the rocker arm 30. Accordingly, the distance between the center of the cam 100 and the center of the pin 610 of the rotating member 600 may be set to be "a", and the timing angle, at which the valve 200 is opened and closed by the cam 100, may be set to be "b", so that the valve 200 is opened and closed.

FIG. 5 is a view illustrating an ON state of variable control. In FIG. 5, it may be seen that the rotary shaft 500 may rotate in the arrow direction and the eccentric position 430 may be moved toward the cam 100. A cam shaft (not shown) at the center of rotation of the cam 100 and the rotary shaft 500 of the eccentric generation means may be fixed to the engine. Since the eccentric cam 400 may rotate by the rotary shaft 500 and the eccentric position 430 may be moved, eccentricity may be generated on the basis of the rocker arm 300. Thus, the rocker arm 300 may be pressed in the left and top direction on the drawing and may come into closer contact with the cam 100. Accordingly, the distance between the center of the cam 100 and the center of the pin 610 of the rotating member 600 may be set to be "a-A", which may be reduced compared to the OFF state of variable control, and the timing angle, at which the valve 200 is opened and closed by the cam 100, may be set to be "b+B", which may be advanced compared to the OFF state of variable control, so that the opening time of the valve 200 is fast.

Therefore, when the switching time of the valve 200 is advanced as in FIG. 5, the opening time of the valve 200 may be fast and the timing at which air begins to be sucked is fast. In this case, the position at which the pressure section 700 comes into contact with the valve 200 may be moved in the left and top direction, i.e. in the diagonal direction, and thus the opening degree of the valve 200 may be increased. Accordingly, when the engine is operated at high speed or middle-low speed, the valve 200 may be controlled by the method as in FIG. 5 such that the opening time of the valve 200 is fast and the opening degree of the valve 200 is increased.

When the engine is operated at low speed, the valve 200 may be controlled such that the eccentric position 430 is located at a position in the right and down direction by rotating the rotary shaft 500 clockwise. Through such control, the opening timing of the valve 200 may be delayed and the opening degree of the valve 200 may be decreased.

As described above, the valve switching apparatus of the present disclosure can more accurately control the engine, without complicated structure such as a hydraulic circuit, by mechanically varying the eccentric position 430 using eccentric generation means having a simple structure, and by setting the switching time and opening degree of the valve so as to be suitable for each operation state according to each cam profile in the operating area of the engine.

According to the valve switching apparatus of the present disclosure, it is possible to accurately control the switching time and opening degree of the valve according to the operating area of the engine by providing eccentric generation means having the simple structure to the rocker arm, unlike the related art in which the cam is mainly used to adjust the opening degree and switching time of the valve.

In particular, the valve switching apparatus may have a simple structure since the hydraulic circuit having a complicated structure is removed, the weight and number of components of the valve switching apparatus can be reduced, and optimized fuel efficiency and cost reduction can be achieved. In addition, since the valve switching apparatus is mechanically operated, the response thereof can be improved compared to the hydraulic operation method, and the quality of the valve switching apparatus can be enhanced due to low speed torque and an increase in response.

In accordance with the exemplary embodiments of the present disclosure, the valve switching apparatus can accurately control the switching time and opening degree of a valve according to the operating area of an engine by providing an eccentric generation means, having a simple structure, to a rocker arm, unlike the related art in which the cam is mainly used to adjust the opening degree and switching time of the valve.

While the present disclosure has been described with respect to the specific embodiments, it will be apparent to those skilled in the art that various changes and modifications may be made without departing from the spirit and scope of the disclosure as defined in the following claims.

What is claimed is:

1. A valve switching apparatus comprising:
a rocker arm coming into contact with a cam to open and close a valve along with a rotation of the cam; and
an eccentric generation means, including eccentric cams rotatably arranged to the rocker arm and a rotary shaft eccentrically coupled to the eccentric cams, and provided to the rocker arm so as to allow an eccentric position to be changed by a rotation thereof,
wherein the eccentric position of each of the eccentric cams is adjusted according to a rotation of the rotary shaft so that a degree of contact between the cam and the rocker arm is adjustable,
wherein the rocker arm comprises a body coupled to the eccentric cams and an operation section pressed by the body to press the valve, and the operation section is coupled through the body by the rotary shaft, and
wherein the operation section has a rotation hole formed at one side thereof, the rotary shaft passes through the rotation hole, the operation section has an extension portion formed at the other side thereof, the extension portion extends laterally from an upper side of the rotation hole, the extension portion is provided with a pressure section, and the extension portion is formed with support protrusions protruding to the left and right.

2. The valve switching apparatus of claim 1, wherein a rotating member is coupled through one side of the rocker arm by a pin, and a pressure section is provided to the other side thereof such that the valve is pressed by the pressure section.

3. The valve switching apparatus of claim 1, wherein the body has a front portion, a rear portion, and a coupling portion, the front portion and the rear portion are symmetrical to each other relative to a plane perpendicular to the rotation shaft and arranged between the front portion and the rear portion, through-holes are respectively formed at centers of the front and rear portion so that the eccentric cams are coupled to the through-holes, coupling holes are formed at one side of the body, and push portions are formed at the other side of the body while extending laterally from upper sides of the through-holes.

4. The valve switching apparatus of claim 1, wherein:
the body has through-holes formed at a center thereof so that the eccentric cams are coupled to the through-holes, the body has coupling holes formed at one side thereof, and the body has push portions formed at the other side thereof;
the operation section has a rotation hole formed at one side thereof, the operation section has an extension portion formed at the other side thereof, and the extension portion is provided with a pressure section;
the rotary shaft passes through the eccentric cams and the rotation hole so that the body is coupled to the operation section; and
the push portions press the support protrusions formed at the extension portion such that the pressure section presses the valve.

5. The valve switching apparatus of claim 1, wherein the operation section has a bearing provided at a point in which the operation section corresponds to the rotary shaft.

6. The valve switching apparatus of claim 1, wherein bearings are coupled to an outer peripheral surface of each of the eccentric cams.

* * * * *